United States Patent [19]

VanBreemen

[11] Patent Number: 4,482,206
[45] Date of Patent: Nov. 13, 1984

[54] REAR PROJECTION TELEVISION SCREEN HAVING A MULTI-SURFACE FRESNEL LENS

[75] Inventor: Bertram VanBreemen, Indianapolis, Ind.

[73] Assignee: RCA Corporation, New York, N.Y.

[21] Appl. No.: 487,384

[22] Filed: Apr. 21, 1983

[51] Int. Cl.³ ............................................. G03B 21/60
[52] U.S. Cl. .................................................... 350/128
[58] Field of Search ............................... 350/127, 128

[56] References Cited

U.S. PATENT DOCUMENTS

| | | | |
|---|---|---|---|
| 2,200,646 | 5/1940 | Strong et al. | 350/127 |
| 2,338,654 | 1/1944 | MacNeille | 88/28.93 |
| 2,529,701 | 11/1950 | Maloff | 350/128 |
| 2,531,399 | 11/1950 | Cawein et al. | 88/24 |
| 2,589,014 | 3/1952 | McLeod | 88/1.5 |
| 3,523,717 | 8/1970 | Glenn, Jr. | 350/123 |
| 3,705,757 | 12/1972 | Huber | 350/126 |
| 3,754,811 | 8/1973 | Hoadley et al. | 350/127 |
| 3,830,556 | 8/1974 | Bratkowski | 350/128 |
| 4,078,854 | 3/1978 | Yano | 350/128 |
| 4,152,047 | 5/1979 | Inoue | 350/122 |

*Primary Examiner*—Richard A. Wintercorn
*Attorney, Agent, or Firm*—Paul J. Rasmussen; Joseph Laks; Scott J. Stevens

[57] ABSTRACT

A rear projection television receiver comprising a rear projection screen that incorporates a compound Fresnel field lens. The field lens comprises two circular Fresnel lenses that together provide the total refraction for the light impinging on the screen. The angle of incidence of the light striking the individual Fresnel elements is reduced, thereby reducing the amount of light reflected from the Fresnel surfaces. The screen efficiency, especially near the edges of the screen, is thereby increased.

7 Claims, 5 Drawing Figures

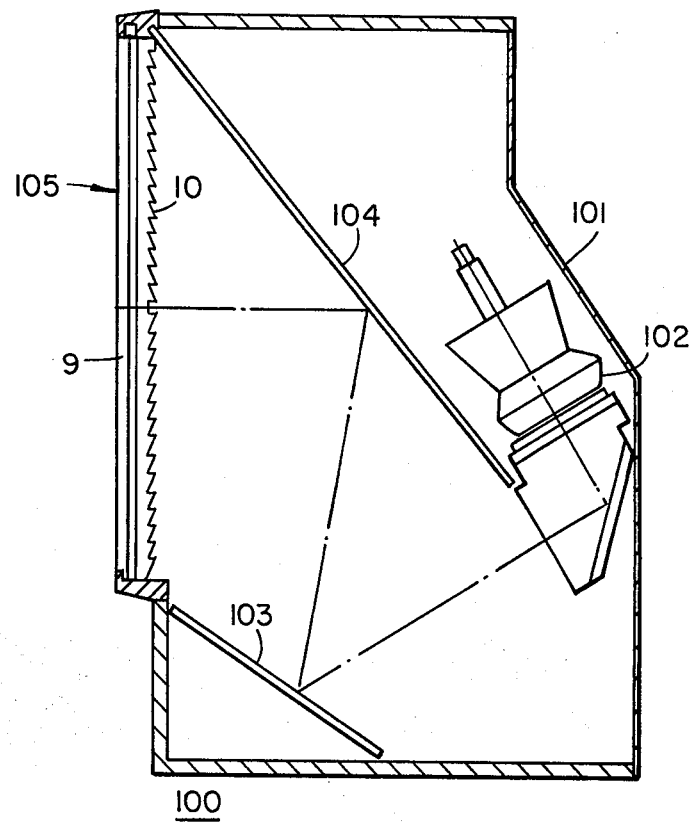
Fig.1
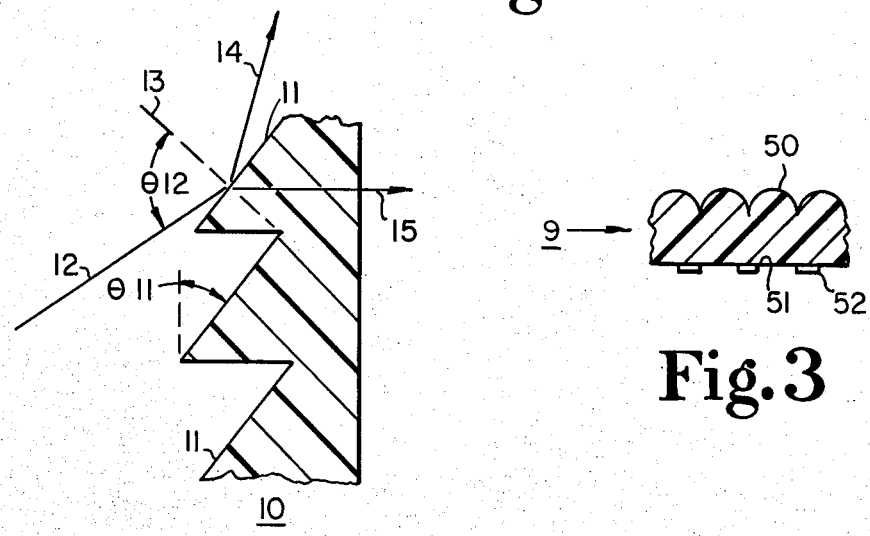
Fig.2
Fig.3

REAR PROJECTION TELEVISION SCREEN HAVING A MULTI-SURFACE FRESNEL LENS

This invention relates to screens for rear projection television receivers and in particular to screens incorporating a Fresnel field lens.

A conventional rear projection television receiver comprises one or more video image sources, and associated magnifying lenses, one or more mirrors for reflecting light from the image sources, and a rear projection screen for displaying the magnified image. It is common to use three monochrome kinescopes as image sources, which produce red, green and blue images, respectively, that are caused to converge at the screen. The mirrors permit the formation of a light ray path of sufficient length to produce the desired image magnification in a compact receiver cabinet.

The rear projection screen comprises a field lens which acts to collimate the light from the image sources that is reflected by the mirrors. The screen also comprises a focusing lens which focuses the light from the field lens onto a viewable image surface. The field lens is typically a Fresnel lens. The focusing lens may comprise a vertically disposed lenticular lens array.

As the angle of the light rays impinging on the Fresnel lens surface increases with respect to a line normal to the Fresnel surface, the amount of light reflected by the Fresnel lens surface increases, as seen in FIG. 3, and the lens efficiency or amount of light transmitted by the lens decreases. This occurs most noticeably near the edges of the screen.

In order to reduce the light lost due to surface reflections, it is necessary to decrease the angle of light incident to the Fresnel lens surface, e.g., by reducing the amount of light refraction that is required by the Fresnel lens. U.S. Pat. No. 4,152,047, issued May 1, 1979, in the name of Y. Inoue and entitled, "Projection Screen Means", uses two Fresnel lenses to reduce ghost images due to internal reflection, but the flat front surfaces of the Fresnel lenses will also create a reflecting surface, further reducing the screen efficiency.

The present invention is directed to a rear projection television receiver having a screen with a Fresnel field lens which has an increased light efficiency, thereby allowing greater flexibility in screen design.

In accordance with the invention, a rear projection television receiver comprises a video image source and a rear projection screen incorporating a field lens for collimating light from the video image source. The field lens has a first circular Fresnel lens that refracts the light through a first angle and a second circular Fresnel lens that refracts the light from the first Fresnel lens through a second angle. The region between the two Fresnel lenses is substantially devoid of any light reflecting surfaces. A focusing lens receives the collimated light from the field lens and focuses it onto an image surface.

In the accompanying drawing:

FIG. 1 is a side elevational view of a rear projection television receiver;

FIG. 2 is a side elevational cross-sectional view of a conventional circular Fresnel lens illustrating a representative light path;

FIG. 3 is a top plan view of the focusing lens of a rear projection television screen;

Figure 4:
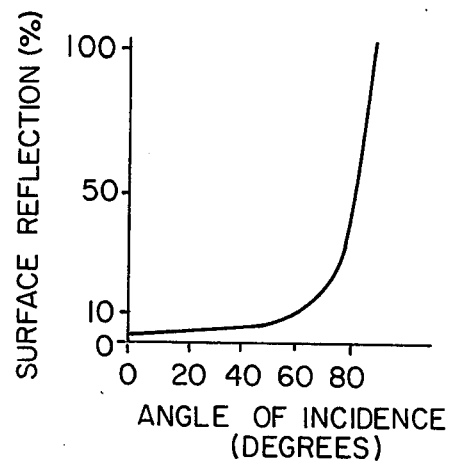
FIG. 4 is a graph illustrating a characteristic of Fresnel lenses.

Referring to FIG. 1, there is shown a rear projection television receiver 100 comprising a cabinet 101, a video image source 102, mirrors 103 and 104, and a rear projection screen 105. The screen comprises a circular Fresnel lens 10 and a focusing lens 9, as shown in FIG. 3. FIG. 2 illustrates a portion of Fresnel lens 10 that may be utilized as a field lens in rear projection television receiver screen 105. The light from Fresnel lens 10 is focused by vertically disposed lenticular lens elements 50 of lens 9 onto an image surface 51. Focusing lens 9 may comprise a plurality of vertically disposed contrast-enhancing black stripes 52 located between the lighted region on image surface 51. Fresnel lens 10 is constructed of a large number of concentric circular lens elements 11 which, in cross section are shown as forming an angle designated $\theta 11$ with respect to the vertical. Angle $\theta 11$ is larger for lens elements near the edges of the screen than for elements near the screen center.

The light which impinges or is incident on the Fresnel lens 10, represented by light ray path 12, originates at video image source 102 (e.g., three kinescopes producing red, green and blue images, respectively) and is reflected by mirrors 103 and 104 onto Fresnel lens 10 of screen 105. This light forms an angle of incidence, designated $\theta 12$, with line 13, the surface normal to the lens elements 11. The combination of the angle of the diverging light bundle from the reflecting mirrors and the increasing vertical angle of lens elements 11 cause the angle of incidence $\theta 12$ to become quite large near the edges of the Fresnel lens 10 and therefore the edges of the rear projection screen 105.

As can be seen in the graph of FIG. 4, as the incident angle $\theta 12$ of the light impinging on Fresnel lens elements 11 increases above approximately 40°, the amount of light that is reflected by the surface of lens elements 11, designated by light ray path 14, becomes a significant portion of the incident light. The amount of light that is refracted or transmitted, designated by light ray path 15, therefore decreases. For large incident angles of the order of 70°–80°, a substantial amount of the incident light is reflected and lost, thereby causing the screen efficiency at the edges of the screen to be quite low.

Figure 5:
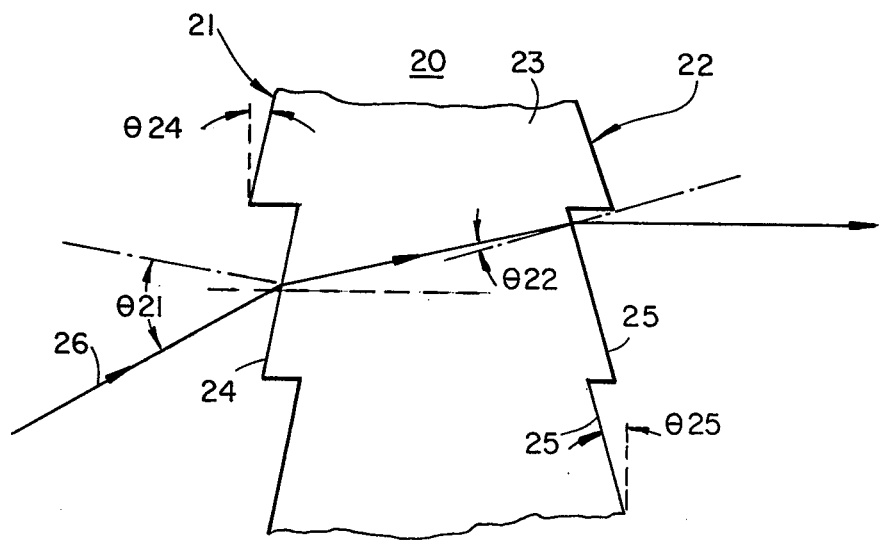
FIG. 5 is a side elevational cross-sectional view of a portion of a rear projection television screen, illustrating a Fresnel field lens constructed in accordance with the present invention.

In accordance with the present invention, FIG. 5 illustrates a compound Fresnel lens structure 20 incorporating first and second circular Fresnel lenses 21 and 22 on opposite sides of a single screen layer element 23. Fresnel lens 21 comprises lens elements 24 which form an angle $\theta 24$ with the vertical. Fresnel lens 22 comprises lens elements 25 which form an angle $\theta 25$ with the vertical. Lens elements 24 and 25 are concentrically aligned on opposite sides of screen layer element 23 with the rear surface of the lens elements 24 and 25 facing each other.

The angles $\theta 24$ and $\theta 25$ are smaller than angle $\theta 12$ of FIG. 2 for a given lens location. This results in the angles of incidence $\theta 21$ and $\theta 22$ of a light ray along representative light ray path 26 for each of the Fresnel lenses 21 and 22 being less than that of the angle of incidence along light ray path 12 for Fresnel lens 10 in FIG. 1. By reducing the angle of incidence to a maximum of approximately 40°, the amount of reflected light is correspondingly reduced, thereby increasing screen efficiency. Fresnel lenses 21 and 22 work in combination to provide the same degree of light refraction as that provided by Fresnel lens 10.

The lens elements 24 and 25 of Fresnel lenses 21 and 22 have widths of the order of 0.015 inches. The screen layer element 23 of Fresnel lens structure 20 may be formed of plastic and may, for example, be cast in a two sided mold that has been ground or machined to have the desired Fresnel lens patterns. It is important that the lens region between the lens surfaces of Fresnel lenses 21 and 22 be as free or devoid as possible of defects or flaws that could act as light reflecting surfaces. The lack of any interfacing surfaces between the Fresnel lenses 21 and 22 maintain the high lens efficiency attained through the effective distributing of the light refraction between two lenses.

What is claimed is:

1. A rear projection television receiver comprising:
    a video image source; and
    a rear projection screen comprising:
        a field lens for substantially collimating light from said mirror and incorporating a first circular Fresnel lens for receiving light from said mirror for refracting said light through a first angle and a second circular Fresnel lens for receiving said light from said first Fresnel lens for refracting said light through a second angle, the region between said first and second Fresnel lenses being substantially devoid of any light reflecting surfaces; and
        a focusing lens incorporating an image surface for focusing light from said field lens onto said image surface.

2. The arrangement defined in claim 1, wherein each of said first and second Fresnel lenses comprises a plurality of concentric circular Fresnel elements, said elements of said first Fresnel lens concentrically aligned with said elements of said second Fresnel lens.

3. The arrangement defined in claim 2, wherein the width of said circular Fresnel elements is of the order of 0.015 inches.

4. The arrangement defined in claim 1, wherein said light impinges on said first and second Fresnel lenses at an angle less than 40° with respect to the surface normal to said first and second Fresnel lenses at all points on said field lens.

5. The arrangement defined in claim 1, wherein each of said first and second Fresnel lenses comprises a front and rear surface with said rear surface of said first Fresnel lens facing said rear surface of said second Fresnel lens.

6. The arrangement defined in claim 1, wherein said field lens is made of plastic.

7. The arrangement defined in claim 1, wherein said focusing lens comprises a plurality of vertically disposed lenticular lens elements.

* * * * *